US009128197B2

(12) United States Patent
Mair

(10) Patent No.: US 9,128,197 B2
(45) Date of Patent: Sep. 8, 2015

(54) SYSTEM, DEVICE AND METHOD FOR READING OUT X-RAY INFORMATION STORED IN A STORAGE PHOSPHOR PLATE

(75) Inventor: Stephan Mair, Augsburg (DE)

(73) Assignee: Agfa HealthCare NV, Mortsel (BE)

( * ) Notice: Subject to any disclaimer, the term of this patent is extended or adjusted under 35 U.S.C. 154(b) by 0 days.

(21) Appl. No.: 14/119,251

(22) PCT Filed: Mar. 30, 2012

(86) PCT No.: PCT/EP2012/001438
§ 371 (c)(1),
(2), (4) Date: Nov. 21, 2013

(87) PCT Pub. No.: WO2012/159690
PCT Pub. Date: Nov. 29, 2012

(65) Prior Publication Data
US 2014/0070104 A1    Mar. 13, 2014

(30) Foreign Application Priority Data

May 26, 2011    (EP) ..................................... 11004354

(51) Int. Cl.
*G01T 1/20*    (2006.01)
*G01T 1/29*    (2006.01)

(52) U.S. Cl.
CPC ................. *G01T 1/29* (2013.01); *G01T 1/2012* (2013.01); *G01T 1/2014* (2013.01)

(58) Field of Classification Search
CPC ....... G01T 1/29; G01T 1/2014; G01T 1/2012; G03B 42/047; A61B 6/4494; G03C 11/02
USPC ........................... 250/363.01, 484.4, 581, 584
See application file for complete search history.

(56) References Cited

U.S. PATENT DOCUMENTS 5,311,032 A * 5/1994 Montoro et al. ............... 250/584
5,376,806 A * 12/1994 Hejazi ............................ 250/584

(Continued)

FOREIGN PATENT DOCUMENTS

DE    19719 954 A1    11/1998
EP    2527874 A1    11/2012

(Continued)

OTHER PUBLICATIONS

International Search Report dated Jan. 1, 2013, from International Application No. PCT/EP2012/001438 filed on Mar. 30, 2012.

*Primary Examiner* — David J Makiya
*Assistant Examiner* — Taeho Jo
(74) *Attorney, Agent, or Firm* — Keating & Bennett, LLP

(57) ABSTRACT

A system, a device, and a method for reading out X-ray information stored in a storage phosphor plate includes a storage phosphor plate and a device for reading out X-ray information stored in the storage phosphor plate including a light source for generating stimulating light that excites the storage phosphor plate to have it emit first emission light, and a detector for detecting the first emission light emitted by the storage phosphor plate. At least one marking is arranged and configured in such a way that stimulating light can impinge on the marking and can be at least partially reflected and/or scattered by the marking and/or can excite the marking to have it emit second emission light, wherein the reflected or scattered stimulating light, respectively, or emitted second emission light, respectively, can be detected by the detector, and marking information can be derived therefrom.

20 Claims, 3 Drawing Sheets

(56) References Cited

U.S. PATENT DOCUMENTS

Figure 1:
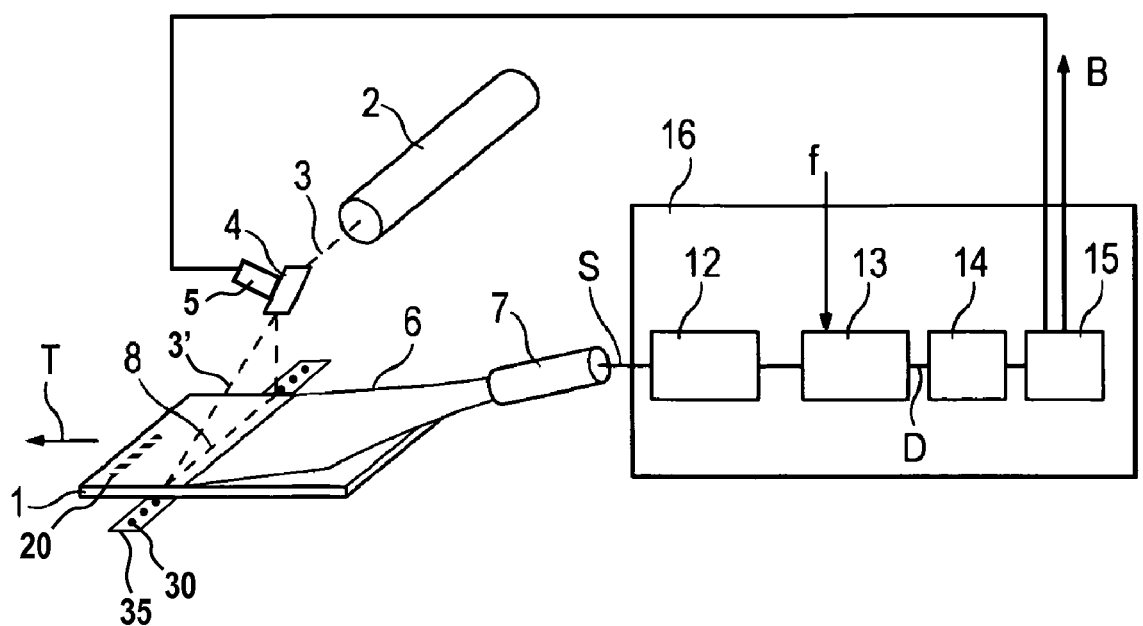

| | | | |
|---|---|---|---|
| 5,592,374 A * | 1/1997 | Fellegara et al. | 705/3 |
| 5,596,202 A * | 1/1997 | Arakawa | 250/484.4 |
| 5,939,728 A * | 8/1999 | Wachtel et al. | 250/586 |
| 6,043,506 A * | 3/2000 | Heffelfinger et al. | 250/584 |
| 6,313,477 B1 | 11/2001 | Yasuda et al. | |
| 6,355,938 B1 * | 3/2002 | Cantu et al. | 250/584 |
| 6,854,643 B2 * | 2/2005 | Manico et al. | 235/375 |
| 7,170,080 B2 | 1/2007 | Fasbender et al. | |
| 7,186,996 B2 * | 3/2007 | Struye et al. | 250/586 |
| 7,304,316 B2 | 12/2007 | Mair | |
| 7,329,891 B2 | 2/2008 | Frankenberger et al. | |
| 7,427,769 B2 * | 9/2008 | Haug et al. | 250/581 |
| 7,465,950 B2 | 12/2008 | Mair et al. | |
| 7,550,754 B2 * | 6/2009 | Bueno et al. | 250/587 |
| 7,573,034 B2 * | 8/2009 | Heath et al. | 250/361 R |
| 7,601,973 B2 | 10/2009 | Frankenberger et al. | |
| 7,612,357 B2 | 11/2009 | Mair et al. | |
| 7,620,230 B2 * | 11/2009 | Haug et al. | 382/132 |
| 8,278,637 B2 | 10/2012 | Mair et al. | |
| 8,452,069 B2 | 5/2013 | Struye et al. | |
| 2003/0160186 A1 * | 8/2003 | Van den Bergh et al. | 250/484.4 |
| 2005/0133730 A1 * | 6/2005 | Haug et al. | 250/484.4 |
| 2005/0134936 A1 * | 6/2005 | Haug et al. | 358/448 |
| 2006/0027770 A1 * | 2/2006 | Struye et al. | 250/586 |
| 2007/0138419 A1 * | 6/2007 | Bueno et al. | 250/586 |
| 2008/0055587 A1 | 3/2008 | Scherer et al. | |
| 2008/0185535 A1 * | 8/2008 | Bueno et al. | 250/483.1 |
| 2008/0265187 A1 * | 10/2008 | Boutet et al. | 250/585 |
| 2013/0234048 A1 | 9/2013 | Reiser et al. | |

FOREIGN PATENT DOCUMENTS

| | | |
|---|---|---|
| JP | 58072040 | 4/1983 |
| JP | 58072041 | 4/1983 |

* cited by examiner

SYSTEM, DEVICE AND METHOD FOR READING OUT X-RAY INFORMATION STORED IN A STORAGE PHOSPHOR PLATE

The present invention relates to a system, a corresponding device as well as a corresponding method for reading out X-ray information stored in a storage phosphor plate according to the preamble of the independent claims.

The storing of X-rays penetrating an object, for example a patient, as a latent image in a so-called storage phosphor layer constitutes an option for recording X-ray images. In order to read out the latent image, the storage phosphor layer is irradiated with stimulating light and thereby stimulated to emit emission light. The emission light, the intensity of which corresponds to the image stored in the storage phosphor layer, is detected by an optical detector and converted into electrical signals. The electrical signals are further processed, as required, and made available for an analysis, in particular for medical-diagnostic purposes, by providing them on a corresponding output device, such as for example a monitor or a printer.

For prior art systems, devices and methods, a reliable reading out of the stored X-ray information, with a straightforward configuration at the same time, cannot be assured for all application cases.

The problem addressed by the present invention is to provide a system, a corresponding device as well as a corresponding method that facilitate a read-out of the stored X-ray information that is as reliable as possible, while providing a more straightforward configuration.

The aforesaid object is achieved by the system, the device and the method, respectively, according to the independent claims.

The system according to the present invention comprises a storage phosphor plate in which X-ray information can be stored and a device for reading out X-ray information stored in the storage phosphor plate by using a light source that generates stimulating light that can stimulate the storage phosphor plate in order to have it emitting a first emission light, and a detector for detecting the first emission light emitted by the storage phosphor plate, and is characterized by at least one marking that is arranged and configured in such a way that stimulating light can impinge on the marking and can be reflected at least partially by the marking and/or can stimulate the marking in order to have it emitting a second emission light, in particular luminescent light, wherein the reflected stimulating light and the emitted second emission light, respectively, are detected by the detector and a marking information can be derived therefrom. The system is further characterized by a control device that permits controlling the read-out of the storage phosphor plate and/or a processing of the read out X-ray information depending on the marking information.

The device according to the present invention comprises a light source for generating stimulating light that can stimulate the storage phosphor plate in order to have it emitting a first emission light, and a detector for detecting the first emission light emitted by the storage phosphor plate, and is characterized by at least one marking that is arranged and configured in such a way that stimulating light can impinge on the marking and can be reflected at least partially by the marking and/or can stimulate the marking for emitting second emission light, in particular luminescent light, wherein the reflected stimulating light and the emitted second emission light, respectively, are detected by the detector and a marking information can be derived therefrom. The device further comprises a control device that permits controlling the reading out of the storage phosphor plate and/or a processing of the read out X-ray information depending on the marking information.

The method according to the present invention, wherein a storage phosphor plate is stimulated to have it emitting a first emission light with the stimulating light generated by a light source, said first emission light being detected by a detector, is characterized in that the stimulating light generated by the light source impinges on at least one marking provided on the storage phosphor plate and/or in the device and is thereby reflected at least partially by the marking and/or stimulates the marking in order to have it emitting a second emission light, in particular luminescent light, wherein the reflected stimulating light and the emitted second emission light, respectively, are detected by the detector and a marking information is derived therefrom, on the basis of which the reading out of the storage phosphor plate and/or a processing of the read out X-ray information is controlled.

The invention is based on the thought of providing a light-reflecting, light-scattering and/or luminescent, i.e. fluorescent or phosphorescent, marking on the storage phosphor plate and/or in the device used for reading out the storage phosphor plate, and reading out said marking by means of the components provided in the device for reading out the storage phosphor plate, in particular the light source that generates the stimulating light and the detector for detecting the first emission light excited by the stimulating light, whereby the stimulating light that impinges on the marking and that is partially reflected or scattered, respectively, and/or the luminescent light that is excited in the marking by the stimulating light is detected by the detector and converted into corresponding marking information. On the basis of the marking information obtained hereby, which relates to, for example, properties of the storage plate or parameters relevant for the reading out process, the reading out process itself and/or the processing of the X-ray information obtained during the reading out process of the storage phosphor plate is controlled.

By detecting the marking by means of the components that are part of the device for the purpose of reading out the storage phosphor plate anyhow, it is possible to dispense with the usually required additional components—for example sensors for capturing the barcode on the storage phosphor plate or for capturing certain positions of the stimulating light beam. The configuration of the inventive systems and devices, respectively, is thereby significantly simplified, wherein, as a result of the control of the reading out of the storage phosphor plate and of the processing of the obtained X-ray information, respectively, said control taking place on the basis of the derived marking information, a high image quality is assured at the same time.

In a first preferred embodiment of the invention the marking information contains a first information that relates to the storage phosphor plate and that refers specifically to at least one of the following items of information: Size of the storage phosphor plate, sensitivity of the storage phosphor plate for X-rays, identification number of the storage phosphor plate, one or more defined spatial distances on the storage phosphor plate, manufacturing date and/or expiration date of the storage phosphor plate, beginning of the storage phosphor plate (BOIP) to be read out, beginning of an area to be read out on the storage phosphor plate, as well as the beginning of a line (BOL) to be read out on the storage phosphor plate.

The plate-specific information that is required in particular for the control of the reading out of the storage phosphor plate and/or the processing of the read out X-ray information is thereby provided by straightforward means, and can be detected using inventive means with a straightforward design of the system and the device, respectively.

For example, the device can be controlled by the control device, on the basis of a parameter for the characterization of the sensitivity of the storage phosphor plate for X rays that is determined from the marking, in such a manner that in the case of a high sensitivity of the storage phosphor plate a low intensity of the stimulating light and/or a low sensitivity of the detector for emission light is set, and in the case of a low sensitivity a high intensity of the stimulating light and/or a high sensitivity of the detector for emission light is set. The same applies to the information regarding the size of the storage phosphor plate, which is determined on the basis of the marking.

Alternatively or in addition a verification can be performed in the control device on the basis of the detected manufacturing and/or expiration date, to indicate whether the storage phosphor plate is still in a state required for a reliable X ray recording, said verification being performed by comparing the current date with the detected expiration data or an expiration date that is calculated from the detected manufacturing date, and that in the case, for example, the respective expiration date is exceeded, the reading out process is not started and/or a corresponding information is issued to the operator and/or device parameters are adjusted. The device parameters to be adjusted concern, for example, the transport speed of the storage phosphor plate during and/or after the reading out procedure. For example, the transport speed can be reduced in particular during the erasing of the storage phosphor plate in an erasure unit in which the storage phosphor plate is irradiated with erasing light.

Alternatively or in addition an absolutely defined distance information can be determined on the basis of a marking that is applied to the storage phosphor plate and that has the form of marks that are spaced apart from one another by a defined distance, such as for example points, lines or two-dimensional geometric forms, said absolutely defined distance information being, for example, delineated in the read out X ray image and/or used for a correction of the read out X ray image.

Alternatively or in addition the reading out process is controlled, on the basis of the detected information regarding the beginning of the storage phosphor plate, the area to be read out or the line to be read out, respectively, of the storage phosphor plate, in such a manner that the detection of the X-ray information stored in the storage phosphor plate is only started in the case when the corresponding marking is detected or a certain specified time period has passed since the detection of the respective marking.

In a further preferred embodiment the marking information contains a second information that relates to the reading out of the storage phosphor plate and/or the processing of the read out X-ray information and that refers in particular to at least one of the following items of information: Location of the storage phosphor plate, which is to be read out, in the device, temporal behavior of a stimulating light beam moving along a line as well as the temporal change of the sensitivity of the device during the reading out of a line of the storage phosphor plate. The information that is required for the control of the reading out of the storage phosphor plate and the subsequent processing of the X-ray information, respectively, is thereby provided by straightforward means and can be detected using inventive means with a straightforward design of the system and the device, respectively.

For example, the processing of the X-ray information that is obtained can be controlled on the basis of the detected information regarding the temporal behavior of the stimulating light beam and/or the temporal change of the sensitivity of the device during the reading out of a line of the storage phosphor plate. In particular effects on the obtained X ray image due to speed variations of the stimulating light beam or sensitivity variations of the device, respectively, in particular of the light source for the stimulating light and/or of the detector for the detection of the first emission light, can be compensated for and thereby be eliminated during a corresponding processing of the X-ray information. The same applies to deviations in the position of the storage phosphor plate from a specified nominal position during the reading out, for example due to a slight tipping or twisting of the plate relative to the nominal position.

Furthermore preferred is that the storage phosphor plate has a base layer and a storage phosphor layer that is applied to a first side of the base layer, and that the marking is located on the first side of the base layer. The arrangement of the marking on the side of the base layer where the storage phosphor layer is also located, has the effect that no further measures have to be taken for the reading of the marking by means of the components provided for the reading out of the storage phosphor layer, said measures being, for example, a redirection of the stimulating light and/or the excited emission light, so that a configuration is achieved which is as straightforward as possible.

Preferably the marking is located in an area of the base layer that lays external to the storage phosphor layer. This assures that on the one hand the area of the storage phosphor layer intended for an X ray recording is not diminished by the marking and that, on the other hand, the storage phosphor layer is not additionally excited to have it emitting emission light during the reading of the marking, which as a consequence could interfere with the detection of the marking information.

In particular the marking can have the form of a barcode, in which data is encoded in the form of lines and gaps of different widths. By these means in particular storage plate-specific data can be encoded in a particular straightforward manner. Furthermore the barcodes can also be read with high reliability with the components provided for the reading out of the storage phosphor plate, so that loss of information can be practically ruled out.

Furthermore preferred is that the marking comprises at least one mark, in particular in the form of points, lines or two-dimensional forms, whose form and/or position on the first side of the base layer determines the marking information. Through the detection of such a mark, information that is in particular relevant for the reading out process can be derived by straightforward and reliable means, for example at the beginning of the storage phosphor plate to be read out or of the area to be read out or of the respective line on the storage phosphor plate, respectively. The reading out process is controlled depending on the marking information obtained hereby.

In a further preferred embodiment the marking is arranged in such a manner in the device that a stimulating light beam generated by the light source can impinge on the marking prior to and/or after the stimulating light beam impinges on the storage phosphor plate during the reading out. In this context relevant quantities for the reading out and/or the processing of the obtained X ray information can be derived from the obtained marking information, for example regarding the position of the storage phosphor plate to be read out relative to the device and its components, as well as regarding the temporal behavior of the stimulating light beam and/or the sensitivity of the device during the reading out of a line of the storage phosphor plate.

Furthermore preferred is that the marking reflects and/or scatters the stimulating light more strongly, at least in partial areas of the marking, than the storage phosphor plate. This has the effect that the stimulating light reflected or scattered, respectively, by the marking is adequately strong to be also sufficiently reliably detected by the detector if said detector—if applicable including a filter that is located in front of the detector—has a very low sensitivity for the stimulating light that is scattered during the reading out of the storage phosphor plate.

Furthermore it is an advantage that the sensitivity of the detector, if applicable including a filter that is located in front of the detector, is higher for the second emission light emitted by the marking than for the stimulating light. In particular the second emission light that is emitted by the marking is hereby emitted in a spectral range that is shifted to longer or shorter wavelengths relative to the spectral range of the stimulating light. This assures that in the case of luminescent markings the emission light emitted by the respective marking and detected by the detector is not distorted by stimulating light components which could for example arise as a result of reflections or scattering of the stimulating light.

Figure 2:
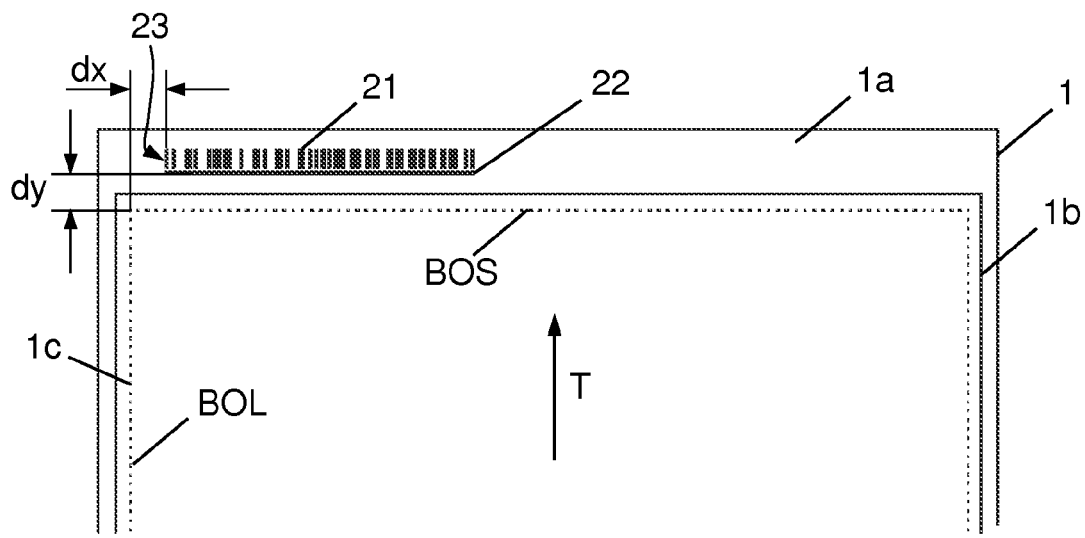
Figure 3:
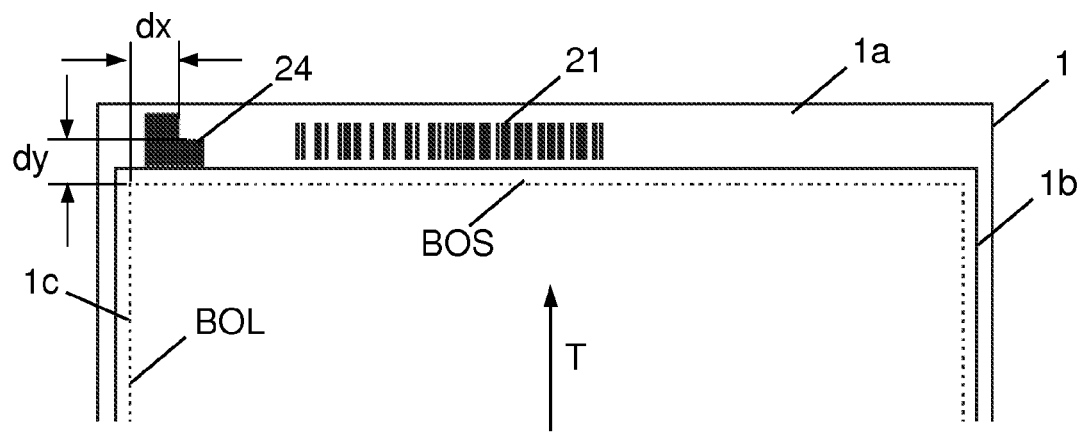
Figure 4:
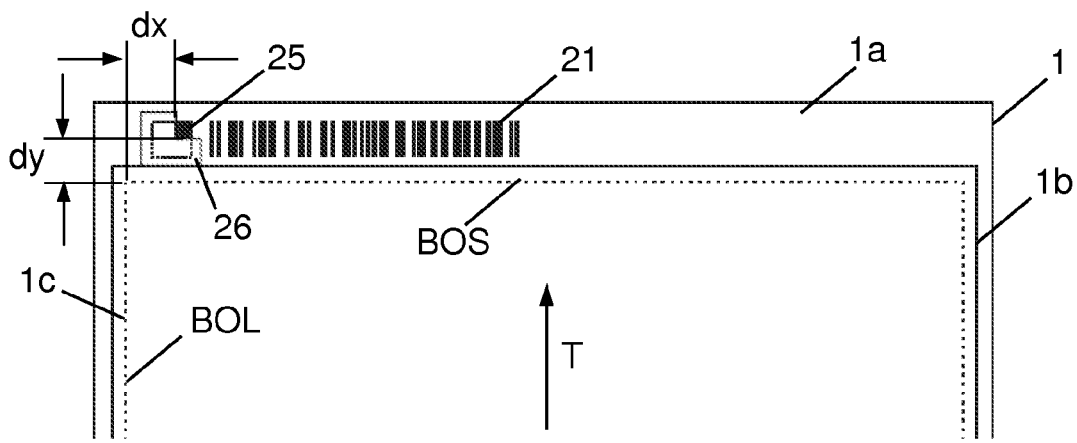
Figure 5:
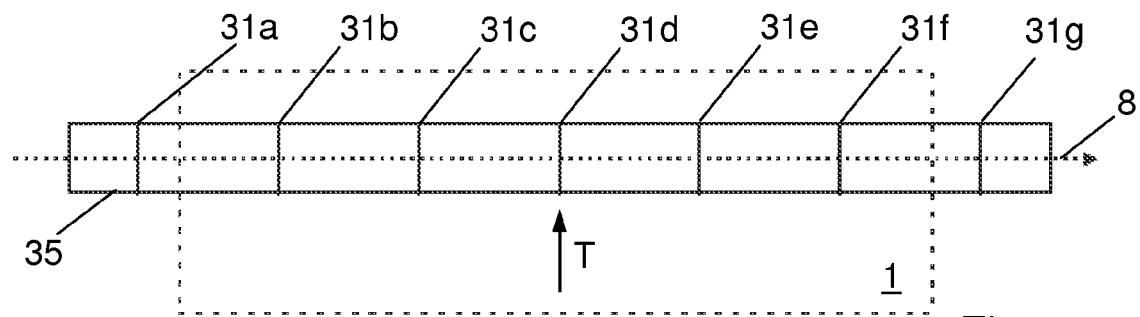
Figure 6:
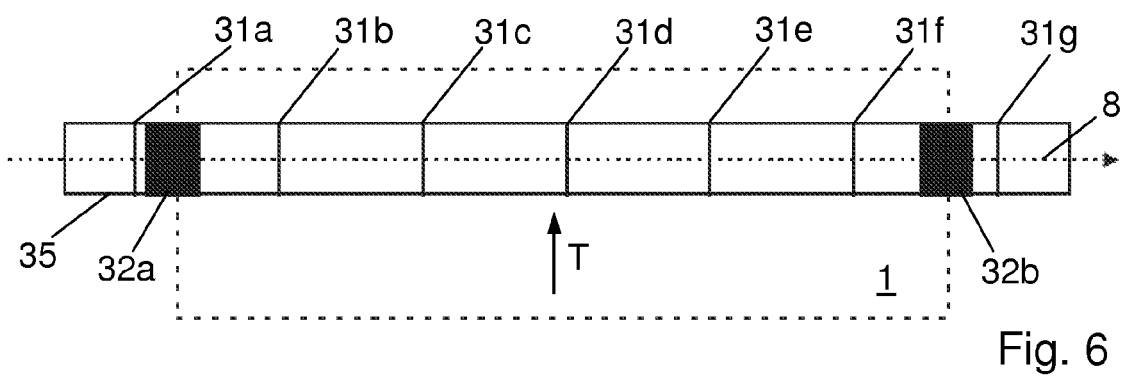
Figure 7:
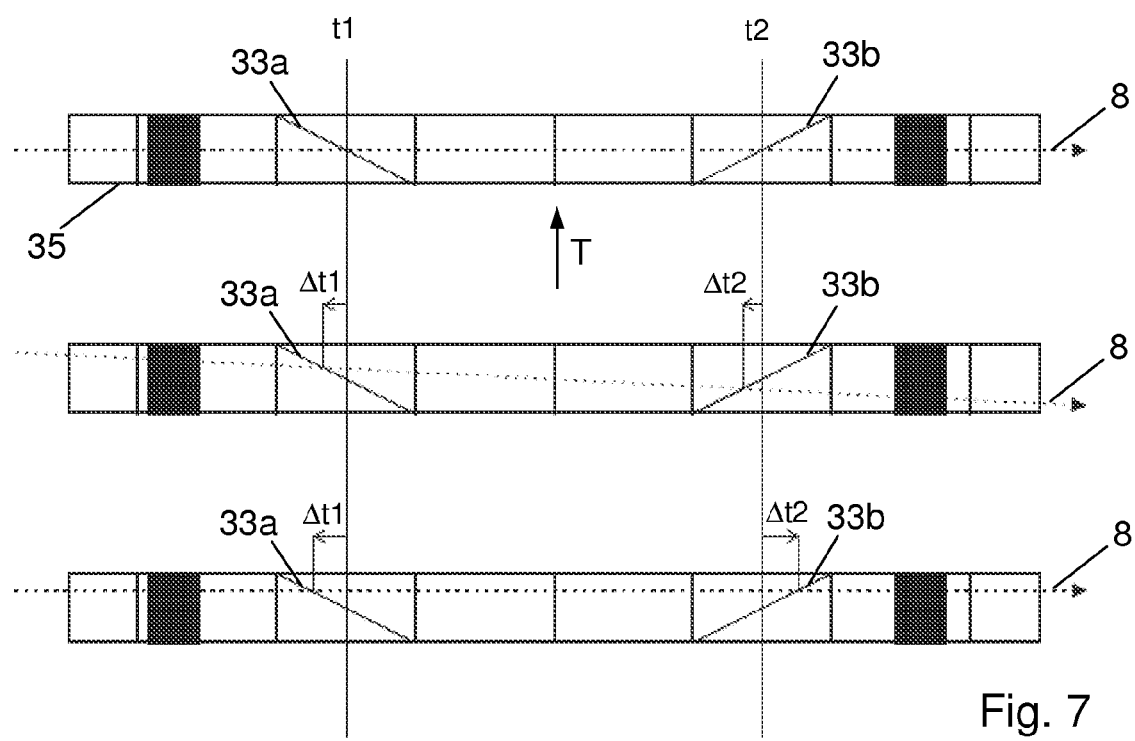

Additional advantages, features and possible applications of the present invention are specified in the following description in the context of the figures. The drawings show:

FIG. 1 a schematic representation of an example of a system with a device for the reading out of storage phosphor plates;

FIG. 2 a first example of markings located on a storage phosphor plate;

FIG. 3 a second example of markings located on a storage phosphor plate;

FIG. 4 a third example of markings located on a storage phosphor plate;

FIG. 5 a first example of markings provided in the device;

FIG. 6 a second example of markings provided in the device;

FIG. 7 a third example of markings provided in the device.

FIG. 1 shows a device for reading out a storage phosphor plate 1. A laser 2 generates a stimulating light beam 3 that is deflected by means of a deflection element 4 in such a way that said stimulating light beam moves along a line 8 across the storage phosphor plate 1 to be read out. The deflection element 4 has a reflecting area, in particular in the form of a mirror that is made to move oscillatingly by drive means 5. Alternatively the deflection element 4 can have a polygon mirror that is made to move rotatively by drive means 5, in this case a motor, and deflects the stimulating light beam 3 across the storage phosphor plate 1.

During the movement of the deflected stimulating light beam 3' across the storage phosphor plate 1 this storage phosphor plate emits emission light depending on the X ray information stored therein, which emission light is collected by an optical collection device 6, for example an optical fiber bundle or a suitable mirror device, and detected by an optical detector 7, preferably a photomultiplier (PMT), and is thereby converted into a corresponding detector signal S. An optical filter (not shown) is preferably disposed in front of the PMT, which filter is substantially transmissive to the emission light and which filter significantly attenuates stimulating light which is scattered partially by the storage phosphor plate during the irradiation thereof and which would reach the PMT via the optical collecting device 6.

The detector signal S is supplied to a processing device 16, in which image signal values B for individual pixels of the read out X ray image are derived. If the read out line 8 is, for example, composed of 1000 pixels, then 1000 corresponding image signal values B are derived from the detector signal S that was obtained during the reading out of the line 8.

The transport of the storage phosphor plate 1 in the transport direction T by means of a transport device (not shown) has the effect that individual lines 8 of the storage phosphor plate 1 are successively read out, and a two-dimensional composite X ray image is thereby obtained that is composed of individual pixels with respectively one associated image signal value B. If the number of lines 8 read out in the transport direction T is, for example, 1500, then, with respectively 1000 pixels per line 8 for the read out X ray image, a total of 1500 times 1000 pixels is obtained with respectively one associated image signal value B.

In principle it is also possible to support the storage phosphor plate 1 in a stationary manner and to move the remaining components, in particular the laser 2, the deflection element 4, the collecting device 6 and the detector 7, relative to the storage phosphor plate 1.

The detector signal S is initially filtered in a low-pass filter 12, wherein high-frequency components of the detector signal S, in particular noise components, are eliminated. The filtered detector signal S is then supplied to an analog-digital converter 13 and sampled there at a sampling frequency f, wherein during every sampling process a detector signal D is obtained in respective digital units. The sampling of the detector signal S in the analog-digital converter 13 takes preferably place according to the so-called sample-and-hold principle, according to which during the sampling the current analog signal amplitude of the detector signal S that is being applied to the analog-digital converter 13 at the time of sampling is held, in each case, and converted into a corresponding digital detector signal value D. After intermediate buffering in memory 14 the image signal values B are calculated in a control unit 15 from the detector signal values D.

The control unit 15 is connected with the drive means 5 for driving the deflection element 4 and controls said deflection element in such a manner that the deflection element 4 is only actively driven, through the release of drive energy from the drive means 5, in the case when or after the deflected stimulating light beam 3' has reached a certain direction and/or position, for example if the deflected stimulating light beam 3' scans across a sensor (not shown) that is located on one of the two longitudinal sides of the storage phosphor plate, whereupon said sensor transmits an electrical pulse to the control unit 15 that—if applicable, after a presettable time delay—controls the drive means 5 then in such a manner that said drive means temporarily releases drive energy, in particular in form of a drive energy pulse, to the oscillating deflection element 4 and thereby maintains said deflection element's oscillation, preferably in the range of a resonance frequency of the deflection element 4.

A marking 20 is disposed on the storage phosphor plate 1 in such a manner that said marking arrives in the area of line 8 during the transport of the storage phosphor plate 1 in transport direction T. There the deflected stimulating light beam 3' impinges on the marking 20 and is reflected or scattered, respectively, at least partly therefrom, or excites said marking to have it emitting luminescent light. The hereby reflected or scattered, respectively, stimulating light or emitted luminescent light, respectively, is collected—similar to the emission light excited in the storage phosphor plate 1—by the optical collecting device 6, forwarded to the optical detector 7, and converted there into a corresponding detector signal S. A marking information is derived from the detector signal S—after corresponding signal processing—in the control unit 15, on the basis of which the control unit 15 controls the reading out process of the storage phosphor plate 1 and/or the subsequent processing of the read out X ray information, in particular in the form of the detector signals D and/or the image signal values B.

The marking information comprised in the marking 20 refers, for example, to specific parameters regarding the storage phosphor plate 1, such as for example the size of the storage phosphor plate 1, the sensitivity of the storage phosphor plate 1 for X rays, the manufacturing date and/or an expiration date of the storage phosphor plate 1, an identification number for the unambiguous identification of the storage phosphor plate 1, the beginning of the storage phosphor plate 1 ("begin of image plate", BOIP), the beginning of the area to be read out ("begin of scan", BOS) or the line to be sampled in each case ("begin of line", BOL), respectively, of the storage phosphor plate 1.

In the example shown of the device, an additional marking 30 is provided beneath and substantially parallel to the line 8, along which the deflected stimulating light beam 3' is guided across the storage phosphor plate 1. The marking 30 is preferably applied to a base 35 that is disposed in the device in such a manner that the storage phosphor plate 1 can be transported in the transport direction T relative to the marking 30 on the one hand, and relative to the components 2 to 7 of the read out device on the other. The deflected stimulating light beam 3' therefore impinges on the marking 30 when the storage phosphor plate 1 is not yet or is no longer in the area of the line 8, i.e. prior to the beginning or after the end of the reading out process.

In the example shown the marking 30 is wider than the storage phosphor plate 1 and protrudes beyond both sides of the storage phosphor plate 1. As a result the deflected stimulating light beam 3' can impinge on the protruding areas of the marking 30 when a storage phosphor plate 1 is located, during the reading out process, between the marking 30 on the one hand and the components 2 to 7 of the read out device on the other.

The stimulating light 3' that impinges on the marking 30 is at least partially reflected or scattered, respectively, and/or excites the marking 30 to have it emitting luminescent light. As in the case of the marking 20 that is located on the storage phosphor plate 1, in the case of the marking 30, which is provided in the device, the reflected stimulating light or the emitted luminescent light, respectively, is similarly also collected by the collecting device 6, forwarded to the optical detector 7 and converted there into a corresponding detector signal S, from which marking information is derived in the control unit 15 that is used for controlling the reading out process of the storage phosphor plate 1 and/or the processing of the read out X ray information.

The marking information derived from the marking 30 permits, inter alia, conclusions regarding the position of the storage phosphor plate 1 to be read out relative to the components 2 to 7 of the read out device, the temporal behavior of the deflected stimulating light beam 3' that is moved along the line 8 or a possible temporal change in the sensitivity of the device, in particular of the components 2 to 7 of the read out device, during the reading out of a line 8 of the storage phosphor plate.

The markings 20 and 30 are only rendered heavily schematized in the example shown in FIG. 1. Depending on the arrangement, embodiment and information content of the respective marking 20 or 30, respectively, the reading out of the storage phosphor plate 1 or the processing of the X ray information obtained during the reading out, respectively, is controlled in a different way on the basis of the marking information derived from said marking. This is further described hereinafter.

FIG. 2 shows a first example of markings located on a storage phosphor plate 1, which markings are in the form of a barcode 21, with lines and gaps of different width, as well as in the form of a straight line 22 that runs perpendicular to the lines and gaps of barcode 21. The storage phosphor plate 1 has a base layer 1a on which a storage phosphor layer 1b is applied. The storage phosphor layer 1b preferably does not extend across the entire area of the base layer 1a, so that—as shown in the displayed example—an edge region of the base layer 1a has no storage phosphor layer. The markings in the form of the barcode 21 as well as the straight line 22 are applied in this edge region of the base layer 1a.

In the barcode 21 different information can be encoded that relates in particular to the storage phosphor plate 1, such as for example the size of the storage phosphor plate, the sensitivity of the storage phosphor plate 1 for X rays, an identification number for the unambiguous identification of the storage phosphor plate 1 as well as a manufacturing date and/or an expiration date of the storage phosphor plate 1.

In the example shown one of the lines 23 of the barcode 21 serves as a reference marking for the definition of an edge of the area 1c to be read out of the storage phosphor plate 1b. In the present example the left edge of the area 1c to be read out is spaced apart from the line 23 by a nominal spacing dx. The deflected stimulating light beam 3' (see FIG. 1) line-wise scans across the storage phosphor plate 1, during transport of the storage phosphor plate 1 in the transport direction T, in a direction perpendicular to the transport direction T. For this reason the left edge of the area 1c to be read out of the storage phosphor layer 1b can also be designated as "begin of line" (BOL).

In the example shown the straight line 22 provided in addition to the barcode 21 serves as a reference for the definition of the front edge of the area 1c to be read out of the storage phosphor plate 1b. This guiding edge, viewed in the transport direction T, of the area 1c to be read out is also designated as "begin of scan" (BOS), and is spaced apart from the line 22 by a nominal spacing dy in the present case.

FIG. 3 shows a second example of markings that are located on a storage phosphor plate 1 in the form of a barcode 21 as well as an L-shaped structure 24. The left edge BOL as well as the front edge BOS of the area 1c to be read out of the storage phosphor plate 1d is defined in this example on the basis of arms of the L-shaped structure 24 that run parallel to the left edge BOL or the front edge BOS, respectively, of the area 1c to be read out. Analogously to the example shown in FIG. 2 the left edge BOL or the front edge BOS, respectively, is spaced apart from the corresponding arm of the L-shaped structure 24 in each case by a nominal spacing dx or dy, respectively. Moreover, the statements in connection with the example shown in FIG. 2 apply correspondingly.

FIG. 4 shows a third example of markings that are located on a storage phosphor plate 1 and that are in the form of a barcode 21 as well as a plane structure 25, in particular in the form of a square or a rectangle that is partially covered by an L-shaped cover 26. In this context the plane structure 25 preferably fluoresces and the cover 26 is designed to be reflecting and/or light scattering. Alternatively the cover 26 can also be a part of the storage phosphor layer 1b.

In both cases the reference borders are determined during the sampling of the plane structure 25, which is partially covered by the cover 26, by means of the deflected stimulating light beam 3' and during the detection of the light hereby emitted or reflected, respectively, from the plane structure 25 or the cover 26, respectively, said reference borders being used for defining the left or front edge, respectively, BOL or BOS, respectively, of the area 1c to be read out of the storage phosphor plate 1b. The statements in connection with the examples shown in FIGS. 2 and 3 apply correspondingly.

FIG. 5 shows a first example of markings in the form of fluorescing lines 31a to 31g that are applied to a base 35 disposed in the device and run substantially parallel to the transport direction T of the storage phosphor plate 1, which is indicated in dashed lines, and are arranged adjacent to one another in the direction of the line 8 that is sampled by the deflected stimulating light beam 3' (FIG. 1).

During the reading out process of the storage phosphor plate 1 said storage phosphor plate covers up these fluorescing lines 31b to 31f, so that the deflected stimulating light beam 3' can impinge merely on the fluorescing lines 31a and 31d. The fluorescent light excited in these lines is detected by the detector 7 in the device, wherein the determination can be made, on the basis of the respective times at which a fluorescent light signal is obtained, whether the mean speed of the stimulating light beam 3' deviates from a specified value. Depending on the type and size of the deviation, the detector signal values D that are obtained during the reading out of the storage phosphor layer 1 are assigned to the individual image signal values B in the processing device 16. Speed variations during the movement of the stimulating light beam 3' along the line 8 can be corrected in this way during the reading out of the storage phosphor plate 1. This correction is also referred to as "jitter correction".

When the fluorescing lines 31b to 31 are not covered by a storage phosphor plate 1 that is located in the device, for example prior to the reading out process of a storage phosphor plate 1 or after the completion of said process, a so-called geometry calibration can be performed by also detecting the fluorescent light emitted from the lines 31b to 31f with the detector 7. On the basis of the fluorescent light signals that are hereby obtained at different times, the temporal behavior of the stimulating light beam 3' during the traversal of the line 8 can be determined with high accuracy and be stored. The detector signal values D obtained during a subsequent or a prior reading out process can be assigned to the corresponding image signal values B with particularly high accuracy, taking into account the hereby determined fluorescent light signals.

FIG. 6 shows a second example of markings that are provided in the device, said markings being in the form of fluorescent lines 31a to 31g as well as additional plane areas 32a and 32b, which likewise can be excited to emit fluorescent light by the impingement of stimulating light. When a storage phosphor plate 1 is located in the device and thereby covers in part the plane areas 32a and 32b, the stimulating light beam 3' can merely excite the sections of the plane areas 32a or 32b, respectively, that protrude beyond the storage phosphor plate 1 to have said sections emit fluorescent light. On the basis of the width of the fluorescing sections left or right, respectively, of the storage phosphor plate 1, said width being hereby determined, the position of the storage phosphor plate relative to the device, i.e. to the light source 2 including the deflection device 4 as well as the detector 7, including the optical collecting device 6, can be deduced. The thus determined information regarding the position of the storage phosphor plate 1 in the device is preferably used during the processing of the X ray information obtained during the reading out of the storage phosphor plate 1. Said information is in particular taken into account as part of the correct application of the information determined during the geometry calibration described above. Moreover, the explanations in connection with the example shown in FIG. 5 apply correspondingly.

FIG. 7 shows a third example of markings provided in the device in the form of oblique lines 33a and 33b, which preferably are likewise designed to be fluorescing. The above statements in connection with the examples shown in FIGS. 5 and 6 apply correspondingly to the other markings in the form of fluorescing lines or plane areas, respectively.

In the upper part of FIG. 7, line 8 of the stimulating light beam runs substantially perpendicular to the transport direction T and excites the oblique lines 33a and 33b at times t1 and t2, respectively, to have them emitting fluorescent light, which fluorescent light is detected by detector 7 (see FIG. 1).

For the case shown in the center part of FIG. 7, wherein the stimulating light beam is misaligned and runs not exactly perpendicularly but obliquely to the transport direction T of the storage phosphor plate 1, the stimulating light beam impinges on the oblique lines 33a and 33b, respectively, in each case by a time span $\Delta t1$ and $\Delta t2$, respectively, earlier, so that the detector 7 generates corresponding fluorescent light signals already at these times. The extent of the misalignment of the stimulating light beam can be deduced from the respective temporal offset, and the detector signal values D or image signal values B, respectively, obtained from such a reading out process can be correspondingly corrected.

In the lower part of FIG. 7 a case is shown where the stimulating light beam runs indeed perpendicularly to the transport direction T of the storage phosphor plate 1, but is however offset parallel in the direction of the transport direction T. In this case also the fluorescent light signals obtained through the excitation of the fluorescing oblique lines 33a and 33b, respectively, are likewise offset by the corresponding time spans $\Delta t1$ and $\Delta t2$, respectively, relative to a correctly adjusted stimulating light beam (compare upper part of the figure). The type and extent of misalignment of the stimulating light beam can be deduced from the temporal offset, and said misalignment can be taken into account during the processing, i.e. correction, of the detector signal values D or image signal values B, respectively, obtained during the reading out of the storage phosphor plate 1.

However, not only can a correct adjustment of the optical components be performed during the actual operation of the device on the basis of the misalignment of the stimulating light beam thus determined, but also during the manufacture and/or during servicing of the device.

An adjustment can in principle be performed manually, but it can also take place automatically, for example by means of corresponding actuators that adjust the corresponding optical components.

The optical components to be adjusted concern in particular the laser 2, the deflection element 4 (see FIG. 1) as well as possible imaging optics (not shown) between the laser 2 and the deflection element 4 and/or between the deflection element 4 and the storage phosphor plate 1 or the markings 30 to 33 that are provided in the device, respectively.

As already explained above, the markings 20 to 26 and 30 to 33 that were shown in the context of the described examples are configured so that they reflect stimulating light impinging on them or that they can be excited by the stimulating light, respectively, to emit luminescent light, i.e. phosphorescence or fluorescent light.

Reflecting or light scattering markings are generated, for example, by means of lacquers, inks, engravings or coatings, with which corresponding patterns can be applied or introduced on the storage phosphor plate 1 or the device, respectively. The properties of the lacquers, inks, engravings or coatings that are used differ from those of the base, in particular the base layer 1a of the storage phosphor plate 1, with respect to the reflection and/or scattering of the stimulating light, so that a stimulating light beam 3' scanning across the marking is reflected or scattered, respectively, to different degrees.

The light that is differentially scattered or reflected, respectively, by the pattern is detected by the detector 7 (see FIG. 1), wherein the detector 7 is preferably equipped with a filter that is substantially transmissive to the emission light—preferably in the blue spectral range—that is excited in the storage phosphor plate 1, and that significantly attenuates the stimulating light—preferably in the red spectral range—that is scattered during the reading out of the storage phosphor plate 1. During the detection of the stimulating light that is reflected or scattered, respectively, by the marking, said stimulating light is likewise significantly attenuated by the filter; the degree of reflection or scattering, respectively, of the stimulating light by the markings is however so high, through a suitable selection of, for example, lacquers, inks, engravings or coatings, that despite the significant light attenuation due to the filter in front of the detector 7 said detector still receives sufficient stimulating light in order to generate a sufficiently high detector signal D to permit a reliable derivation of the marking information.

Alternatively or in addition the power of the light source 2, and therefore the intensity of the stimulating light beam 3' and/or the sensitivity of the detector 7, can be temporarily increased during the sampling of the markings, for example by increasing the voltage being applied to the PMT. This assures that the detector 7 can detect the reflected or scattered, respectively, stimulating light that is attenuated by the filter, if applicable, with particularly high reliability and convert said stimulating light into corresponding detector signals D.

Luminescing, in particular fluorescing, markings are generated, for example, through the application of certain luminescing substances onto the storage phosphor plate 1, in particular onto the base layer 1a or in the device, respectively. Preferably these substances emit emission light in a wavelength range in which a filter that is located in front of the detector 7 has a higher transmissivity than in the wavelength range of the stimulating light. The wavelength range of the emission light emitted by these substances can be shifted, relative to the stimulating light, to longer wavelengths (for example on the basis of the Stokes effect) or also to shorter wavelengths (for example on the basis of an Anti-Stokes effect or of multi-photon effects).

Furthermore substances are suitable for the generation of a luminescing marking that exhibit a so-called activated phosphorescence. These substances are activated—quasi "charged"—through irradiation with light, for example after completion of a reading out process of the storage phosphor plate 1 through irradiation with, for example, green and/or red erasing light in an erasure unit located in the device, and can be excited to emit emission light during the next reading out process by means of the stimulating light, said emission light being in a wavelength range below that of the stimulating light.

The invention claimed is:

1. A system for reading out X-ray information stored in a storage phosphor plate, the system comprising:
    a storage phosphor plate in which X-ray information is stored, the storage phosphor plate including at least one marking containing marking information therein;
    a device configured to read the X-ray information stored in the storage phosphor plate, the device including a light source configured to generate stimulating light that excites the storage phosphor plate to emit a first emission light, and a detector configured to detect the first emission light emitted by the storage phosphor plate;
    the at least one marking being arranged and configured to at least partially reflect and/or scatter the stimulating light impinging on the at least one marking, and/or to excite the at least one marking to emit a second emission light;
    the marking information including at least one of information regarding the storage phosphor plate and the device, and the at least partially reflected and/or scattered stimulating light and/or the second emission light transmits the marking information to the detector; and
    a controller configured or programmed to control the reading of the storage phosphor plate and/or to process the read X-ray information using the marking information contained in the at least one marking.

2. The system according to claim 1, wherein the marking information includes information regarding the storage phosphor plate.

3. The system according to claim 2, wherein the marking information relates to at least one of the following items of information:
    a size of the storage phosphor plate;
    a sensitivity of the storage phosphor plate for X rays;
    an identification number of the storage phosphor plate;
    a defined spatial distance on the storage phosphor plate;
    a manufacturing date and/or an expiration date of the storage phosphor plate;
    a beginning of the storage phosphor plate to be read;
    a beginning of an area to be read of the storage phosphor plate; and
    a beginning of a line to be read on the storage phosphor plate.

4. The device according to claim 3, wherein the second emission light is luminescent light.

5. The system according to claim 1, wherein the marking information includes information regarding the reading of the storage phosphor plate.

6. The system according to claim 5, wherein the marking information relates to at least one of the following items of information:
    a position of the storage phosphor plate in the device during the reading;
    a temporal behavior of a stimulating light beam moved along a line during the reading;
    a temporal change of a sensitivity of the device, during the reading of a line of the storage phosphor plate, to the first emission light emitted by the storage phosphor plate.

7. The method according to claim 5, wherein the second emission light is luminescent light.

8. The system according to claim 1, wherein the storage phosphor plate includes a base layer and a storage phosphor layer applied to a first side of the base layer, and the at least one marking is located on the first side of the base layer.

9. The system according to claim 8, wherein the at least one marking is located in an area of the base layer outside of the storage phosphor layer.

10. The system according to claim 8, wherein the at least one marking includes a barcode in which data is encoded in lines and gaps of different width.

11. The system according to claim 8, wherein the at least one marking includes at least one mark, and a form and/or a position of the at least one mark on the first side of the base layer defines the marking information.

12. The system according to claim 11, wherein the at least one marking includes points, lines, or two-dimensional forms.

13. The system according to claim 1, wherein the at least one marking is located in the device such that a stimulating light beam generated by the light source impinges on the at least one marking prior to and/or after the stimulating light beam impinges on the storage phosphor plate during the reading.

14. The system according to claim 1, wherein the at least one marking reflects and/or scatters the stimulating light at least in partial areas of the at least one marking more strongly than the storage phosphor plate.

15. The system according to claim 1, wherein a sensitivity of the detector is higher for the second emission light emitted by the at least one marking than for the stimulating light.

16. The system according to claim 1, wherein the second emission light is luminescent light.

17. A device for reading out X-ray information stored in a storage phosphor plate, the device including a light source configured to generate a stimulating light that excites the storage phosphor plate to emit a first emission light, and a detector configured to detect the first emission light emitted by the storage phosphor plate, the device comprising:
   at least one marking arranged and configured such that stimulating light impinges on the at least one marking and is at least partially reflected and/or scattered by the at least one marking, and/or the stimulating light excites the at least one marking to emit a second emission light;
   the at least one marking containing marking information therein, the marking information including at least one of information regarding the storage phosphor plate and the device, and the at least partially reflected and/or scattered stimulating light and/or the second emission light transmits the marking information to the detector;
   a controller configured or programmed to control the reading of the storage phosphor plate and/or to process the read X-ray information using the marking information contained in the at least one marking.

18. A storage phosphor plate for use in the device according to claim 17, the storage phosphor plate comprising:
   at least one marking arranged and configured such that stimulating light impinging on the at least one marking causes the at least one marking to at least partially reflect and/or scatter, and/or to excite the at least one marking to emit a second emission light; wherein
   the at least one marking contains marking information therein, and the marking information includes at least one of information regarding the storage phosphor plate and the device, and the at least partially reflected and/or scattered stimulating light and/or the second emission light transmits the marking information to a detector.

19. A method for reading X-ray information stored in a storage phosphor plate in a device, the storage phosphor plate being configured to emit a first emission light in response to a stimulating light generated by a light source which first emission light is detected by a detector, the method comprising the steps of:
   impinging the stimulating light generated by the light source on at least one marking provided on the storage phosphor plate and/or in the device;
   the stimulating light causing the at least one marking to at least partially reflect and/or scatter the stimulating light, and/or to excite the at least one marking to emit a second emission light;
   detecting the reflected and/or scattered stimulating light or the emitted second emission light with the detector, the marking information including at least one of information regarding the storage phosphor plate and the device, and the at least partially reflected and/or scattered stimulating light and/or the second emission light transmits the marking information to the detector; and
   controlling the reading of the storage phosphor plate and/or a processing of the read X-ray information using the marking information contained in the at least one marking.

20. A storage phosphor plate for use in the process according to claim 19, the storage phosphor plate comprising:
   at least one marking arranged and configured such that stimulating light impinging on the at least one marking causes the at least one marking to at least partially reflect and/or scatter, and/or to excite the at least one marking to emit a second emission light; wherein
   the at least one marking contains marking information therein, and the marking information includes at least one of information regarding the storage phosphor plate and the device, and the at least partially reflected and/or scattered stimulating light and/or the second emission light transmits the marking information to a detector.

\* \* \* \* \*